(12) United States Patent
Berne

(10) Patent No.: US 10,919,452 B2
(45) Date of Patent: Feb. 16, 2021

(54) CAMERA ASSEMBLY FOR AN INDUSTRIAL VEHICLE CAB

(71) Applicant: Volvo Truck Corporation, Gothenburg (SE)

(72) Inventor: Nicolas Berne, Heyrieux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/495,483

(22) PCT Filed: May 22, 2017

(86) PCT No.: PCT/IB2017/000823
§ 371 (c)(1),
(2) Date: Sep. 19, 2019

(87) PCT Pub. No.: WO2018/215811
PCT Pub. Date: Nov. 29, 2018

(65) Prior Publication Data
US 2020/0086796 A1  Mar. 19, 2020

(51) Int. Cl.
*B60R 1/12* (2006.01)
*B60Q 1/24* (2006.01)
*B60Q 1/32* (2006.01)

(52) U.S. Cl.
CPC ............. *B60R 1/12* (2013.01); *B60Q 1/24* (2013.01); *B60Q 1/323* (2013.01); *B60R 2001/1215* (2013.01); *B60R 2001/1253* (2013.01)

(58) Field of Classification Search
None
See application file for complete search history.

(56) References Cited

U.S. PATENT DOCUMENTS 6,690,413 B1 *  2/2004  Moore ................. B60R 1/00
                                          348/148
7,175,320 B1 *  2/2007  Burgess ............. B60Q 1/0483
                                          340/433

(Continued)

FOREIGN PATENT DOCUMENTS

EP      0945306 A1    9/1999
JP      H1059077 A    3/1998

OTHER PUBLICATIONS

Furnion, English Translation of EP0945306 (Year: 1999).*

(Continued)

*Primary Examiner* — Fernando Alcon
(74) *Attorney, Agent, or Firm* — Withrow & Terranova, PLLC

(57) ABSTRACT

The invention relates to a camera assembly (50) for an industrial vehicle cab (5) comprising a side door (15) and a step, the camera assembly (50) being designed to be mounted on the cab (5) above the door (15) and comprising: —a supporting arm (51) provided, at a first end thereof, with a mounting device for mounting on the cab (5); —a camera arranged on said supporting arm (51), for providing an image of an area located rearwards and/or sidewards, in the operative position; —a lighting system (30) including at least one light source, the lighting system (30) being mounted on the supporting arm (51) or housed therein and being arranged to provide a light beam (31) directed downwards for illuminating the step, in the operative position.

13 Claims, 4 Drawing Sheets

(56) References Cited

U.S. PATENT DOCUMENTS

| | | | |
|---|---|---|---|
| 2002/0080016 A1* | 6/2002 | Keirstead | B60R 1/00 340/436 |
| 2007/0182527 A1* | 8/2007 | Traylor | G01S 17/93 340/435 |
| 2008/0179485 A1* | 7/2008 | Yang | B60R 1/078 248/475.1 |
| 2009/0273941 A1 | 11/2009 | Englander et al. | |
| 2010/0244698 A1* | 9/2010 | Nakamura | B60Q 1/24 315/77 |
| 2014/0218521 A1* | 8/2014 | Tanaka | B60Q 1/24 348/148 |
| 2015/0103543 A1* | 4/2015 | Pastrick | F21S 43/14 362/465 |
| 2015/0286878 A1* | 10/2015 | Molin | H04N 5/2624 348/148 |
| 2016/0300113 A1* | 10/2016 | Molin | G06T 7/80 |
| 2016/0379411 A1* | 12/2016 | Harbach | G09G 5/003 345/633 |
| 2017/0124881 A1* | 5/2017 | Whitehead | B60Q 9/008 |

OTHER PUBLICATIONS

International Search Report and Written Opinion for International Patent Application No. PCT/IB2017/000823, dated Apr. 6, 2018, 15 pages.

\* cited by examiner

CAMERA ASSEMBLY FOR AN INDUSTRIAL VEHICLE CAB

This application is a 35 USC 371 national phase filing of International Application No. PCT/IB2017/000823, filed May 22, 2017, the disclosure of which is incorporated herein by reference in its entirety.

TECHNICAL FIELD

The invention relates to a camera assembly designed to be mounted on an industrial vehicle cab, an industrial vehicle cab comprising such a camera assembly, and to an industrial vehicle comprising such a camera assembly or such a cab. The invention also relates to process for controlling a camera assembly of a vehicle.

The invention can be applied to several industrial vehicles, such as trucks, buses and construction equipment.

BACKGROUND

An industrial vehicle cab defines a driver compartment the floor of which is generally located fairly high relative to the ground. As a consequence, such a cab generally comprises a step arranged on a side wall of the cab, for allowing the driver to climb up to/get down from the driver compartment.

Using the step requires caution from the driver, especially when it's dark, to avoid falls and injuries. To lower the risks, cabs can be equipped with a lighting system for illuminating the step. However, conventional lighting systems are not fully satisfactory in terms of lighting efficiency, compactness and cost, among others.

SUMMARY

An object of the invention is to provide an improved step lighting system for an industrial vehicle cab.

To that end, according to a first aspect, the invention relates to a camera assembly for an industrial vehicle cab comprising a side door and a step, the camera assembly being designed to be mounted on the cab above the door and comprising:

a supporting arm provided, at a first end thereof, with a mounting device for mounting on the cab;

a camera arranged on said supporting arm, for providing an image of an area located rearwards and/or sidewards, in the operative position;

wherein the camera assembly further comprises a lighting system including at least one light source, the lighting system being mounted on the supporting arm or housed therein and being arranged to provide a light beam directed downwards for illuminating the step, in the operative position.

The terms defining locations or orientations (such as "front", "side", "rear" and the like) are used relative to the vehicle cab, in the operative position of the camera assembly, i.e. when the camera assembly is mounted on the vehicle cab.

In other words, the invention proposes to incorporate a lighting system—for the step and the ground surrounding area—on or in a camera assembly mounted on the vehicle cab. Such a solution has many advantages.

Significant advantages derive from the fact that the lighting system is arranged on or in an existing part mounted on the cab. Thus, the lighting system can be fairly easily installed insofar as, for that purpose, existing mechanical components and electrical connections can be used. Besides, because no specific additional supporting member has to be mounted on the cab for the lighting system, no arrangements on the cab structure are required, and the overall cab cost is reduced. Impacts on aerodynamics are also limited or even non-existent.

Another advantage lies in the fact that regulations allow a camera assembly to protrude outwardly from the cab side wall much more than other components. As a result, the lighting system can be located far enough from said cab side wall to provide a satisfactory illumination of the area of the ground at the bottom of the step, in addition to the illumination of the step itself. This further enhances the driver's safety.

Because the lighting system is fixed relative to the cab structure, the invention makes it possible to provide a light beam having an appropriate direction whatever the door position, in contrast to a lighting system which would be fastened to a mobile component, such as the door or a component fastened to the door. Thus, the driver can clearly see the entry/exit ground area when the door is closed and the steps when the door is open.

This allows reducing accidents. It also helps the driver prepare the vehicle and access the cab.

For example, the camera assembly can be mounted in an upper front area of a cab side wall. The camera can provide an image of the area along the cab side wall, rearward. Alternatively, the camera assembly can be mounted on the cab roof; in such an implementation, the supporting arm has to sufficiently protrude outwards from the cab side wall to allow a proper illumination of the cab step.

The camera can be arranged near the supporting arm second end, opposite the first end.

According to an embodiment, the supporting arm comprises a lower wall, the lighting system being configured to provide a light beam from or through said lower wall.

In a possible implementation, the supporting arm comprises a lower wall, a housing which receives the lighting system and which opens in said lower wall, and a transparent or translucent cover for closing the housing and allowing the light beam emitted by the lighting system to pass through said cover. The cover can be substantially level with the outer face of the supporting arm lower wall.

According to an embodiment, the supporting arm comprises a first portion designed to be mounted on the cab and a second portion which is mounted on the first portion so as to be able to pivot relative to the first portion between an operative position and a parking position. For example, in the parking position, the supporting arm does not significantly protrude relative to the cab, being folded against the cab side wall, while in the operative position, the supporting arm protrudes outwardly, so that the camera can provide an image and the lighting system can illuminate the appropriate area.

A lighting system can be mounted on or housed in the supporting arm first portion, and/or mounted on or housed in the supporting arm second portion.

The lighting system can be designed to provide a light beam:

which substantially forms an angular sector, in a plane which is substantially vertical and longitudinal in the operative position, said angular sector having an angle ($\alpha$) ranging from 15° to 60°, for example around 40°;

and/or which substantially forms an angular sector, in a plane which is substantially vertical and transverse in the operative position, said angular sector having an angle ($\beta$) ranging from 5° to 40°.

According to a second aspect, the invention relates to an industrial vehicle cab defining a driver compartment and having a front wall and two side walls, the cab comprising a side door for entering the driver compartment and a step arranged on a side wall for allowing the driver to climb up to/get down from the driver compartment, wherein the cab comprises a camera assembly as previously described, the supporting arm of the camera assembly being mounted on the cab above the door and protruding outwardly from one cab side wall, so that the lighting system is arranged to provide a light beam towards at least part of the step and towards an area of the ground at the bottom of the step.

For example, the supporting arm is mounted on one cab side wall, above the door and preferably close to the front wall. Alternatively, the supporting arm can be mounted on the roof, and arranged to protrude outwardly from the cab side wall, for allowing the lighting system to provide a satisfactory illumination or the area concerned.

The cab may further comprise a control unit connected to the lighting system and capable of varying the light intensity of the light source(s), for example according to a signal received from an ambient luminosity sensor provided on the cab. This control unit can be the vehicle electrical control unit (ECU).

According to an embodiment, the lighting system is designed to provide a light beam which, in a longitudinal vertical plane, is defined between:

a front line extending downwards and forward from the lighting system and forming an angle α1 with the vertical direction (Z), α1 ranging from 5° to 25°;

a rear line extending downwards and rearward from the lighting system and forming an angle α2 with the vertical direction (Z), α2 ranging from 5° to 35.

According to an embodiment, the lighting system is designed to provide a light beam which, in a transverse vertical plane, is defined between:

an outer line extending outwardly and forming an angle β1 with the vertical direction (Z), β1 ranging from 0° to 30°;

an inner line extending inwardly and forming an angle β2 with the vertical direction (Z), β2 ranging from 5° to 10°.

The term "inwardly" means towards the longitudinal symmetrical axis of the cab.

According to a third aspect, the invention relates to an industrial vehicle which comprises a camera assembly as previously described, or a cab as previously described.

According to a fourth aspect, the invention relates to a process for controlling a camera assembly of such a vehicle. The process comprises, from a parking state in which the vehicle engine is stopped and the door is locked, automatically switching the light source(s) on upon receipt of a remote vehicle door unlocking command. Such a command can be sent by the driver from the outside of the cab, when he approaches the vehicle, by means of the vehicle key or a similar actuator.

The process may further comprise, when applicable, automatically pivoting the supporting arm second portion relative to the supporting arm first portion, to the operative position, before the light source(s) are switched on, upon receipt of a remote vehicle door unlocking command.

Besides, the light source(s) can be kept on until the vehicle engine is turned on and, preferably, until the parking brake is released.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
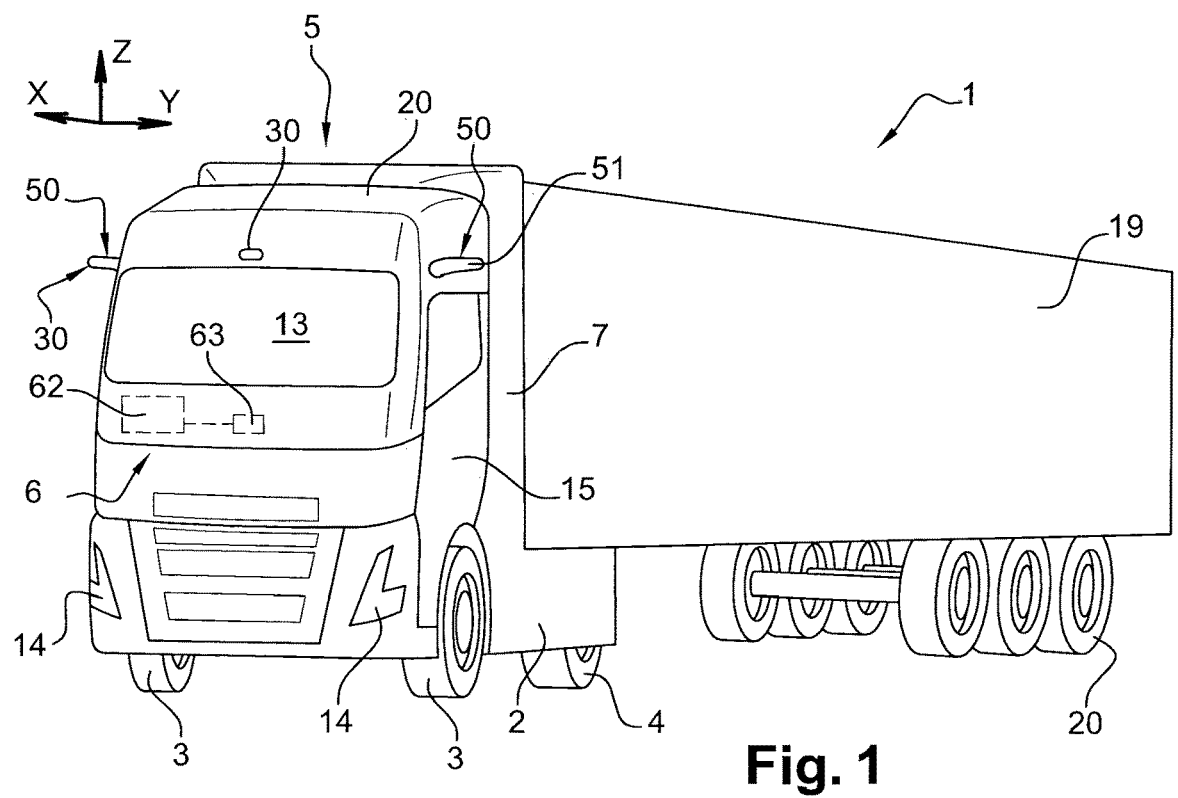
FIG. 1 is a perspective view of an industrial vehicle according to an embodiment of the invention, the vehicle comprising camera assemblies.

FIG. 1 shows a vehicle 1, more specifically an industrial vehicle. Although the invention will be described with respect to a truck, the invention is not restricted to this particular vehicle, but may also be used in other vehicles, such as a bus.

The vehicle 1 comprises a frame 2 supported by front wheels 3 and rear wheels 4 as well as a cab 5. The vehicle 1 can further comprise a cargo body 19 supported by wheels 20. Z is defined as the vertical direction, X is defined as the longitudinal direction of the vehicle 1, and Y is defined as the transversal direction of the vehicle 1.

The cab 5 has a front wall 6 on which are located a windshield 13 and headlamps 14. The cab further has two side walls 7 and a roof 20. It defines a driver compartment 8 having a floor 9, and comprises an opening 10 for entering the driver compartment 8, as shown on FIG. 7. As the floor 9 is located fairly high above the ground, the cab 5 comprises a step 11 arranged on a side wall 7 for allowing the driver to climb up to/get down from the driver compartment 8. In the illustrated embodiment, the step 11 includes three levels 12, but this should not be considered as limitative. The step 11 can be located below the opening 10, forward of the front wheels 3.

The cab 5 comprises a side door 15 which has a substantially vertical hinge axis 16. Thus, the door 15 can pivot between a close position, in which it closes the opening 10 (FIG. 1), and an open position (FIG. 7), for allowing a person to enter the driver compartment 8. The door 15 can comprise a main portion 17 for closing said opening 10 and a bottom portion 18 for covering an upper part of the step 11, such as the part of the step 11 extending down to the upper level 12.

Furthermore, a camera assembly 50 is mounted on the cab 5 above the door 15. Basically, the camera assembly 50 comprises a supporting arm 51 and a camera 52 arranged on said supporting arm 51, for providing an image of an area located rearwards and/or sidewards. Such a camera assembly 50 can typically be part of a so-called camera monitor system (CMS) which further includes a monitor (not shown) inside the driver's compartment 8 for displaying the image provided by the camera 52. Thus, the vehicle 1 according to the invention can be devoid of side exterior mirrors, and possibly also devoid of an interior mirror.

In the illustrated embodiment, a camera assembly 50 is mounted on each side wall 7 of the cab 5. Preferably, a camera assembly 50 can be mounted in an upper front area of each side wall 7. However, this should not be considered as limitative; for example, the camera assembly 50 could be mounted on the roof 20 of the cab 5.

The supporting arm 51 has a first end 53 fastened to the cab 5, by means of a mounting device 54. The supporting arm 51 can have a mounting end face 55 configured to cooperate with a cab side wall 7, i.e. for example substantially parallel to (X,Z) in the operative position. Furthermore, the supporting arm 51 protrudes outwardly from the cab side wall 7, up to its second end 56. The camera 52 can be arranged near the supporting arm second end 56.

Figure 2:
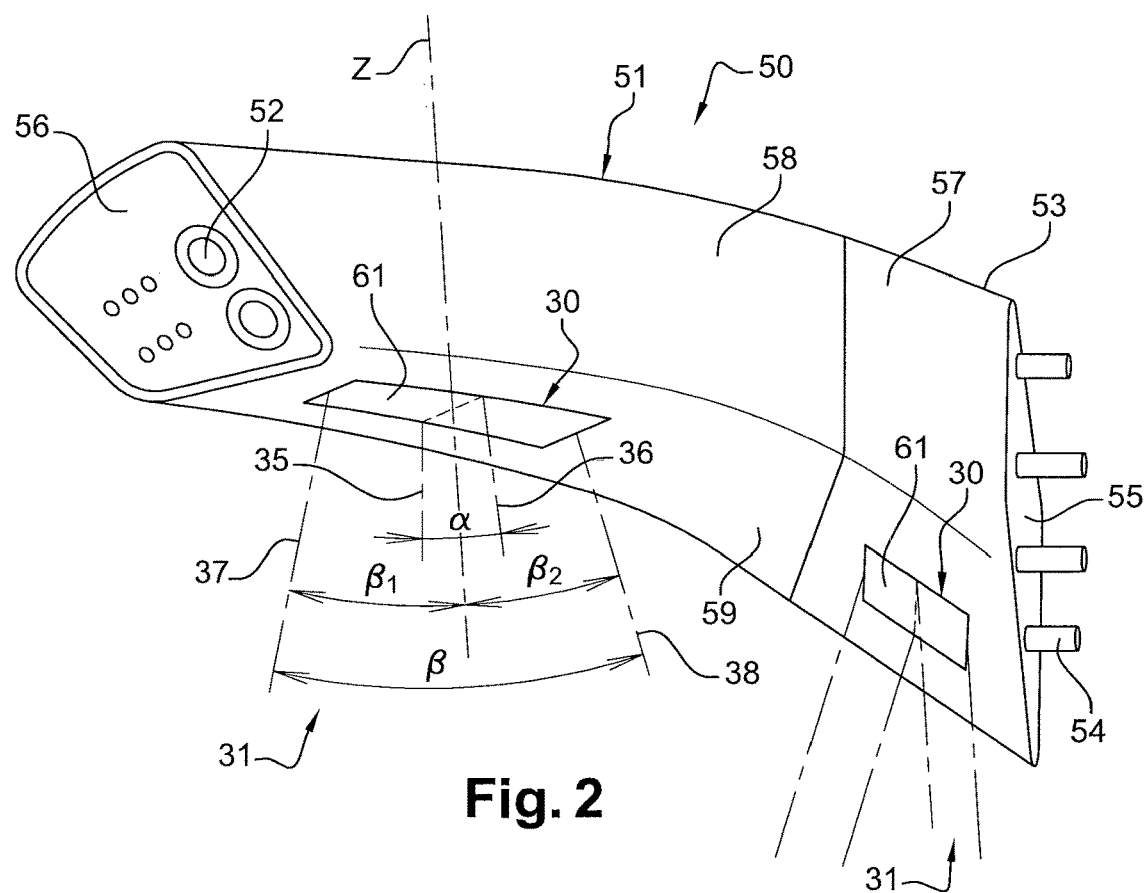
FIG. 2 is a perspective view of a camera assembly according to an embodiment of the invention, comprising a lighting system.

In an embodiment, as shown on FIG. 2, the supporting arm 51 can comprise a first portion 57 mounted on the cab 5 and a second portion 58 which is mounted on the first portion 57 so as to be able to pivot relative to the first portion 57 between an operative position, i.e. a protruding position allowing the camera 52 to capture images, and a parking position, in which the supporting arm 51 is folded along the cab side wall 7, to prevent damages.

Preferably, the supporting arm 51, especially the shape of its front face, is designed to form a wind deflector and not to significantly impair aerodynamics. Besides, the supporting arm 51 comprises a lower wall 59 turned substantially downwards.

The cab 5 further comprises a lighting system 30 for illuminating the step 11.

According to the invention, said lighting system 30 is mounted on the supporting arm 51 of the camera assembly 50, or housed therein. Arranging the lighting system 30 on/in an existing component of the cab 5 contributes to providing a cost efficient solution.

Figure 6:
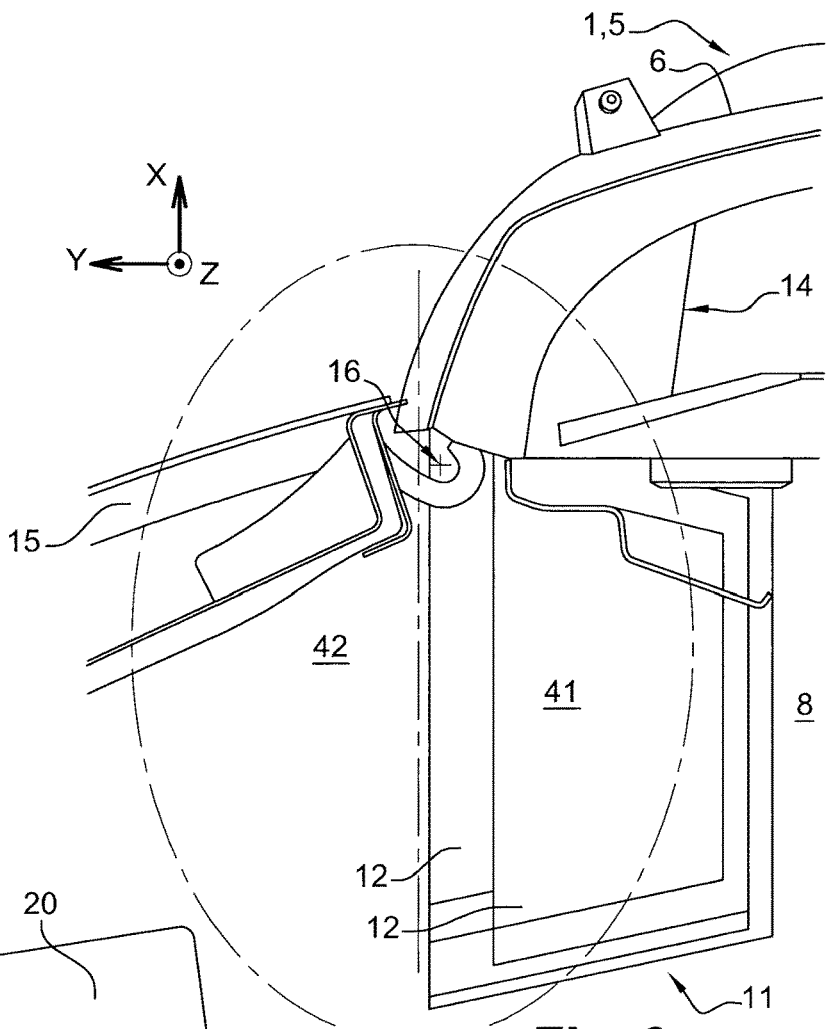
FIG. 6 is a schematic cross-sectional view of the vehicle cab in a horizontal plane, showing the area illuminated by the lighting system.

The lighting system 30 is configured to provide a light beam 31 directed downwards, towards at least an area 41 of the step 11 and towards an area 42 of the ground at the bottom of the step 11 (see FIG. 6). It can further be configured to provide the light beam 31 from or through the lower wall 59 of the supporting arm 51. For that purpose, the supporting arm 51 has to sufficiently protrude outwards from the cab side wall 7 to allow the lighting system 30 to provide a proper illumination of the areas 41 and 42.

The lighting system 30 can be mounted on or housed in the supporting arm first portion 57, or second portion 58. Although FIG. 2 shows a camera assembly 50 provided with a lighting system 30 in both portions 57, 58, only one lighting system 30 can be provided.

Figure 3:
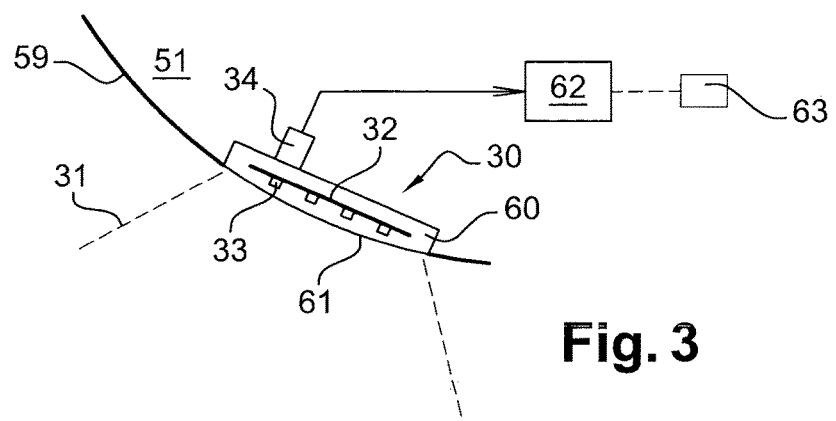
FIG. 3 is a schematic detailed view of the camera assembly of FIG. 2, showing the lighting system and further showing its connection to a control unit.
Figure 4:
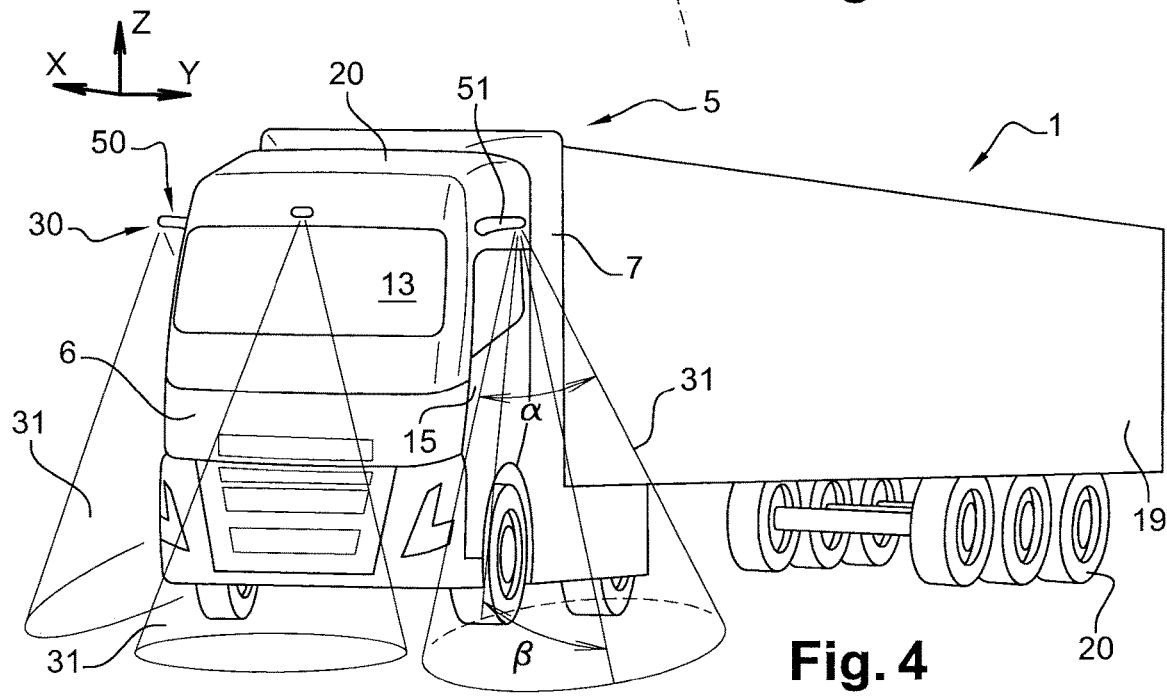
FIGS. 4 and 5 are perspective views of two different industrial vehicles according to the invention, showing the areas illuminated by means of the lighting systems.
Figure 5:
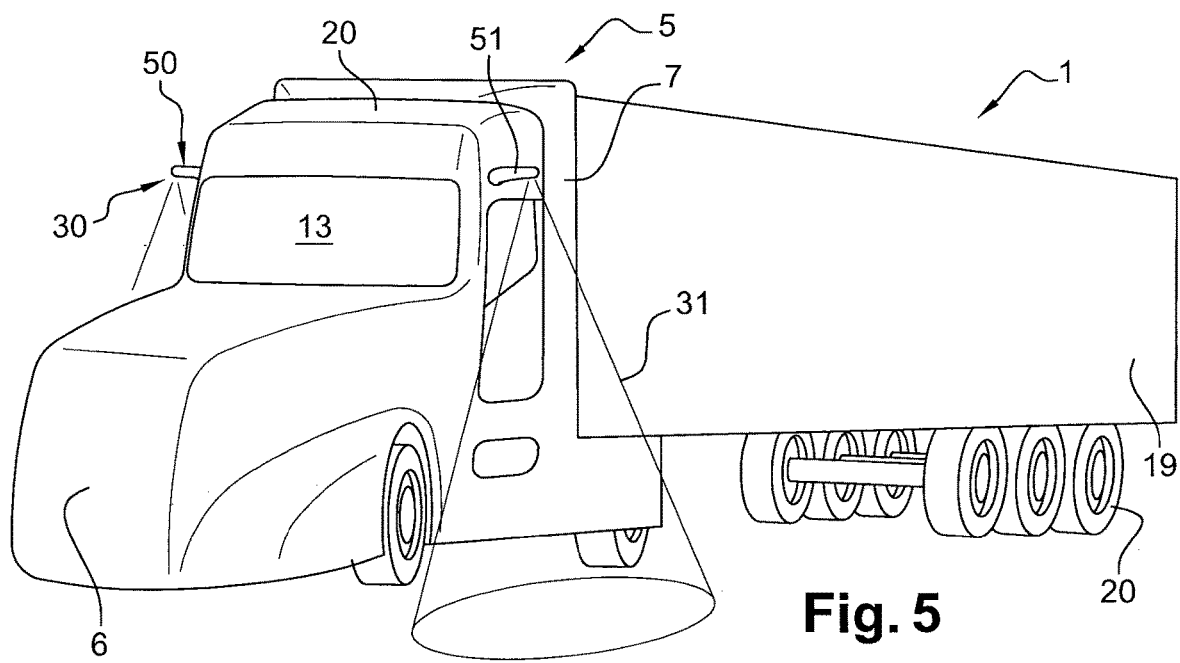

As shown in FIGS. 2 and 3, the supporting arm 51 can comprise a housing 60 which receives the lighting system 30 and which opens in the lower wall 59. A transparent or translucent cover 61 allows closing the housing 60 and the light beam 31 emitted by the lighting system 30 to pass through said cover 61. In an embodiment, the cover 61 is substantially level with the outer face of the supporting arm lower wall 59.

Typically, the lighting system 30 can comprise a printed circuit board (PCB) 32 on which at least one light source 33 is mounted, a connector 34 for connecting the PCB 32 to a vehicle electrical control unit (ECU) 62 by wires housed in the supporting arm 51. The lighting system 30 may further comprise a light deflector (not shown) which is arranged on the path of the beam 31 emitted by the light source(s) 33, and which is designed to deviate the light so as to ultimately provide a beam capable of illuminating the desired area. According to an embodiment, the lighting system comprises several light sources 33. The vehicle electrical control unit (ECU) 62 can be capable of varying the light intensity of the light source(s) 33, for example according to a signal received from an ambient luminosity sensor 63 provided on the cab 5.

As the camera assembly 50 protrudes outwardly from the cab side wall 7, arranging the lighting system 30 on or in the camera assembly 50 allows providing a particularly efficient lighting of the step and ground area at the bottom of the step.

Besides, in order to provide a light beam 31 capable of efficiently illuminating the required area, the lighting system 30 can be designed as explained below. In practice, this can be achieved by an appropriate design of a light deflector.

Figure 7:
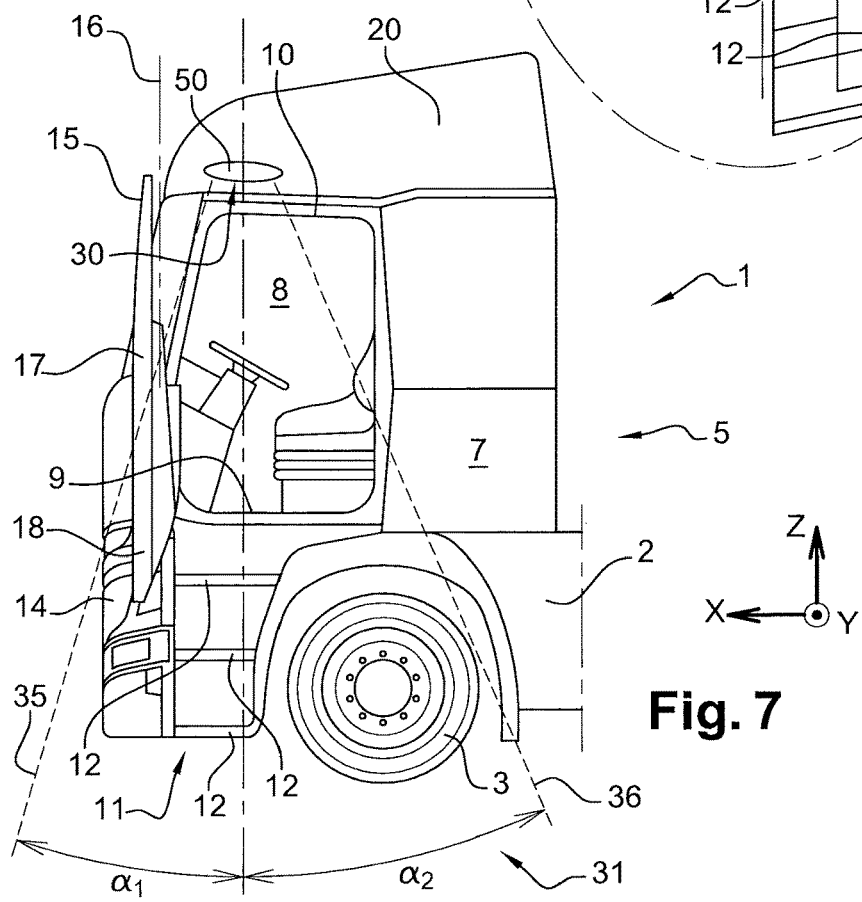
FIG. 7 is a schematic side view of the vehicle cab, showing the light beam provided by the lighting system.

On the one hand, as shown in FIGS. 2 and 7, the light beam 31 can form an angular sector, in a longitudinal vertical plane (X, Z), defined between:

a front line 35 extending downwards and forward from the lighting system 30 and forming an angle $\alpha 1$ with the vertical direction Z, $\alpha 1$ ranging from 5° to 25°;

a rear line 36 extending downwards and rearward from the lighting system 30 and forming an angle $\alpha 2$ with the vertical direction Z, $\alpha 2$ ranging from 5° to 35.

In other words, the light beam 31 can form an angular sector, in a plane which is substantially vertical and longitudinal, i.e. parallel to the cab side wall 7, the angular sector having an angle $\alpha$ ranging from 15° to 60°.

On the other hand, as shown in FIG. 2, in a transverse vertical plane (Y,Z), the light beam 31 can be defined between:

an outer line 37 extending outwardly and forming an angle $\beta 1$ with the vertical direction Z, $\beta 1$ ranging from 0° to 30°;

an inner line 38 extending inwardly and forming an angle $\beta 2$ with the vertical direction Z, $\beta 2$ ranging from 5° to 10°.

The term "inner" refers to a part located closer to the vehicle longitudinal axis of symmetry, as opposed to the term "outer".

In other words, the light beam 31 can form an angular sector, in a plane which is substantially vertical and transverse, i.e. orthogonal to the cab side wall 7, the angular sector having an angle an angle $\beta$ ranging from 5° to 40°.

For example, $\alpha 1$ can be around 10°, $\alpha 2$ can be around 10°; $\beta$ can be around 10°, $\beta 2$ can be around 10°.

The vehicle 1 may further comprise a lighting system 30 mounted on the cab 5 above the windshield 13. Such a front lighting system makes windshield cleaning easier for the driver, and can also be used to make sure the front panel is open when the driver wants to tilt the cab 5.

Figure 8:
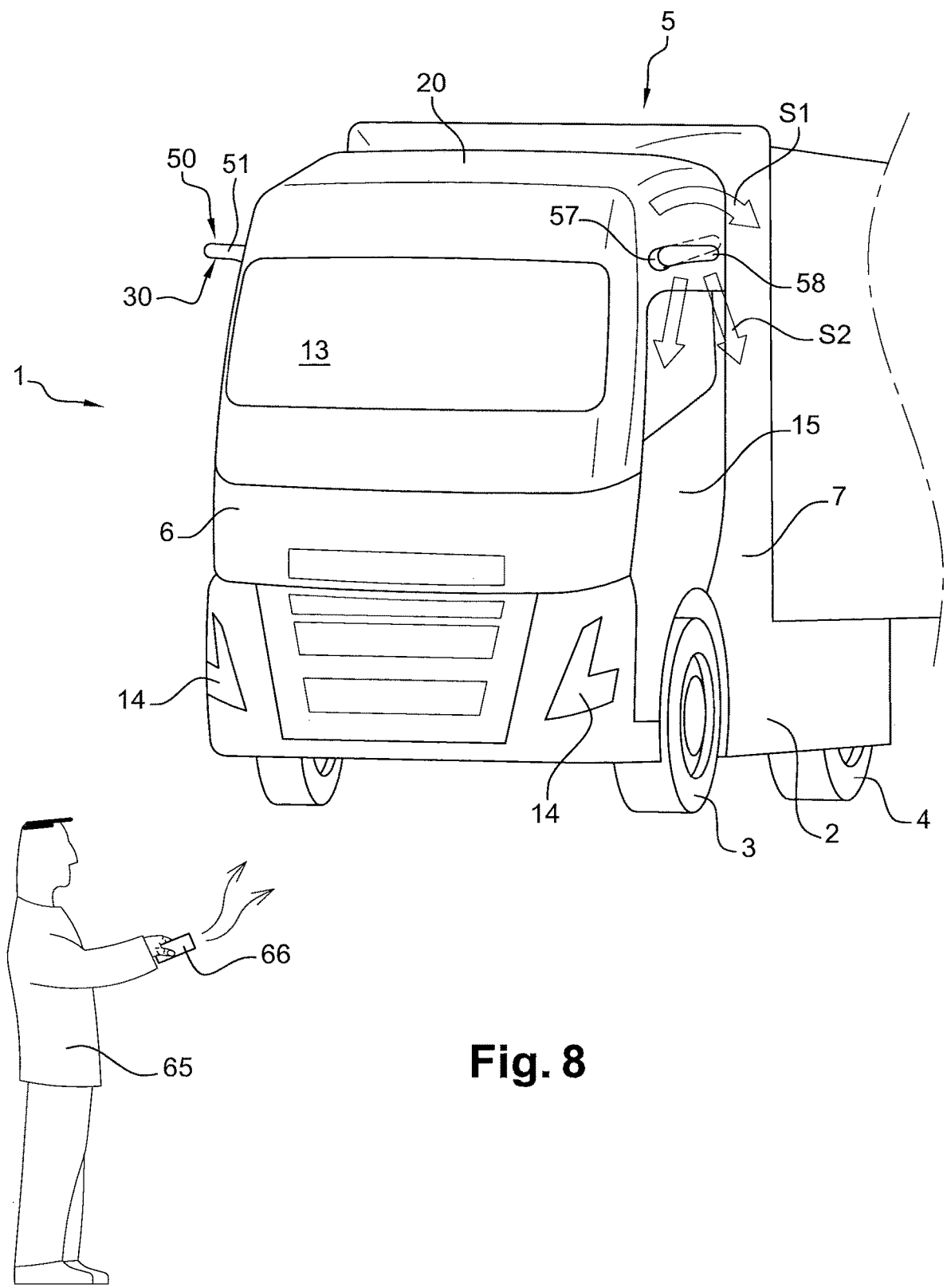
FIG. 8 schematically illustrates the process allowing a user to control such a camera assembly of a vehicle.

Reference is now made to FIG. 8, which shows how a user, generally the driver, can control the camera assembly 50.

When the driver 65 approaches his vehicle 1 in a parking state, i.e. with the engine stopped and the door 15 locked, he remotely controls the door opening by means of an actuator 66, such as the vehicle key.

In an embodiment where the supporting arm 51 is folded along the cab side wall 7 in the parking state, this remote vehicle door unlocking command automatically causes the camera assembly 50 to be put in the operative position (step 1—S1). In other words, the supporting arm second portion 58 is pivoted relative to the supporting arm first portion 57, to the operative position. Of course, this first step is skipped in case the supporting arm 51 is fixedly fastened to the cab 5, i.e. if it always protrudes outwardly and cannot be folded.

Then, the light source(s) 33 are automatically switched on (step 2—S2). The light source(s) 33 can be kept on until the vehicle engine is turned on and, preferably, until the parking brake is released.

Thus, there is provided proximity lighting as soon as the driver unlocks the vehicle, and until he is starting to move.

Of course, the activation of the lighting system 30 can be controlled also when the driver is inside the compartment 8 and the engine is on.

The invention therefore provides a lighting system which is very efficiently integrated in the vehicle architecture, both mechanically and electronically.

It is to be understood that the present invention is not limited to the embodiments described above and illustrated in the drawings; rather, the skilled person will recognize that many changes and modifications may be made within the scope of the appended claims.

The invention claimed is:

1. A camera assembly for an industrial vehicle cab comprising a side door and a step, the camera assembly being designed to be mounted on the cab above the door and comprising:
   a supporting arm provided, at a first end thereof, with a mounting device for mounting on the cab;
   a camera arranged on said supporting arm, for providing an image of an area located rearwards and/or sidewards, in the operative position;
characterized in that it further comprises a lighting system including at least one light source, the lighting system being mounted on the supporting arm or housed therein and being arranged to provide a light beam directed downwards for illuminating the step, in the operative position;
   wherein the supporting arm comprises a first portion designed to be mounted on the cab and a second portion which is mounted on the first portion so as to be able to pivot relative to the first portion between an operative position and a parking position.

2. The camera assembly according to claim 1, wherein the supporting arm comprises a lower wall, the lighting system being configured to provide a light beam from or through said lower wall.

3. The camera assembly according to claim 1, wherein the supporting arm comprises a lower wall, a housing which receives the lighting system and which opens in said lower wall, and a transparent or translucent cover for closing the housing and allowing the light beam emitted by the lighting system to pass through said cover.

4. The camera assembly according to claim 3, wherein the cover is substantially level with the outer face of the supporting arm lower wall.

5. The camera assembly according to claim 1, wherein the lighting system is mounted on or housed in the supporting arm first portion.

6. The camera assembly according to claim 1, wherein the lighting system is mounted on or housed in the supporting arm second portion.

7. The camera assembly according to claim 1, wherein the lighting system is designed to provide a light beam which substantially forms an angular sector, in a plane which is substantially vertical and longitudinal in the operative position, said angular sector having an angle ranging from 15° to 60°.

8. The camera assembly according to claim 1, wherein the lighting system is designed to provide a light beam which substantially forms an angular sector, in a plane which is substantially vertical and transverse in the operative position, said angular sector having an angle ranging from 5° to 40°.

9. An industrial vehicle cab defining a driver compartment and having a front wall and two side walls, the cab comprising a side door for entering the driver compartment and a step arranged on a side wall for allowing the driver to climb up to/get down from the driver compartment, characterized in that it further comprises a camera assembly according to claim 1, the supporting arm of the camera assembly being mounted on the cab above the door and protruding outwardly from one cab side wall, so that the lighting system is arranged to provide a light beam towards at least part of the step and towards an area of the ground at the bottom of the step.

10. The cab according to claim 9, wherein the cab is devoid of side exterior mirrors.

11. The cab according to claim 9, wherein the cab comprises a control unit connected to the lighting system and capable of varying the light intensity of the light source(s), for example according to a signal received from an ambient luminosity sensor provided on the cab.

12. The cab according to claim 9, wherein the lighting system is designed to provide a light beam which, in a longitudinal vertical plane, is defined between:
   a front line extending downwards and forward from the lighting system and forming an angle a1 with the vertical direction, a1 ranging from 5° to 25°;
   a rear line extending downwards and rearward from the lighting system and forming an angle a2 with the vertical direction, a2 ranging from 5° to 35.

13. The cab according to claim 9, wherein the lighting system is designed to provide a light beam which, in a transverse vertical plane, is defined between:
   an outer line extending outwardly and forming an angle ß1 with the vertical direction, ß1 ranging from 0° to 30°;
   an inner line extending inwardly and forming an angle ß2 with the vertical direction, ß2 ranging from 5° to 10°.

\* \* \* \* \*